United States Patent [19]

Sugiura et al.

[11] 4,306,797

[45] Dec. 22, 1981

[54] ELECTROMAGNETICALLY DRIVEN SHUTTER

[75] Inventors: Yoji Sugiura, Yokohama; Nobuaki Date, Kawasaki, both of Japan

[73] Assignee: Canon Kabushiki Kaisha, Tokyo, Japan

[21] Appl. No.: 198,199

[22] Filed: Oct. 17, 1980

[30] Foreign Application Priority Data

Oct. 22, 1979 [JP] Japan .................................. 54-136910

[51] Int. Cl.³ .......................... G03B 9/08; G03B 9/40; G03B 19/12
[52] U.S. Cl. .................................... 354/234; 354/152; 354/246
[58] Field of Search ............................... 354/246–249, 354/234, 235, 152, 156, 153, 154

[56] References Cited

U.S. PATENT DOCUMENTS

| | | | |
|---|---|---|---|
| 3,768,390 | 10/1973 | Kobori | 354/152 |
| 3,922,693 | 11/1975 | Matsui | 354/234 X |
| 3,967,298 | 6/1976 | Adamski | 354/152 X |
| 4,236,797 | 12/1980 | Noack et al. | 354/246 X |
| 4,264,159 | 4/1981 | Ueda et al. | 354/152 X |

*Primary Examiner*—Donald A. Griffin
*Attorney, Agent, or Firm*—Toren, McGeady & Stanger

[57] ABSTRACT

A focal plane shutter mechanism for a single lens reflex camera has its shutter blades driven by an electromagnetic driving source, with setting of shutter blades to their running start positions being mechanically effected in association with mirror driving means thereby diminishing power consumption, and with the shutter blades being electromagnetically driven only during a film exposure.

9 Claims, 4 Drawing Figures

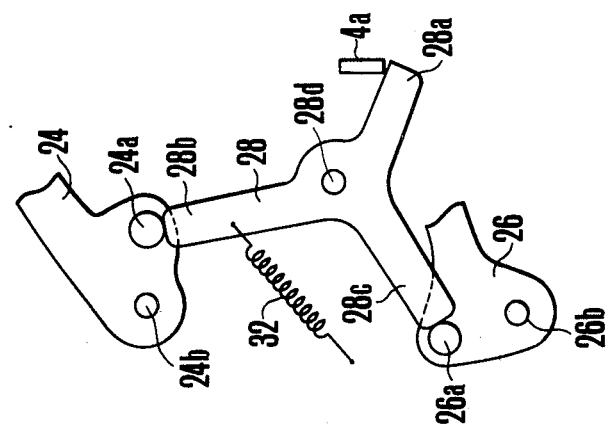
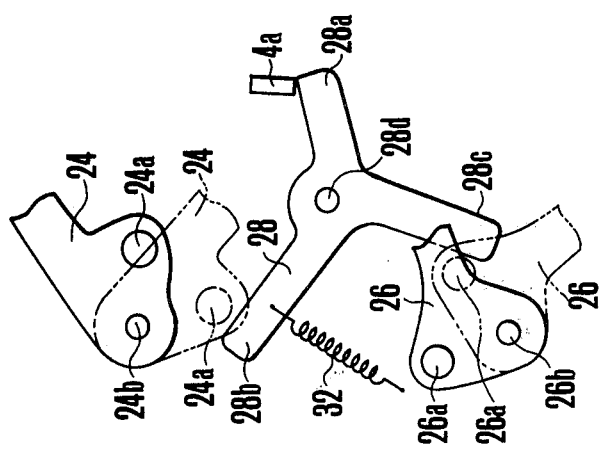

1

ELECTROMAGNETICALLY DRIVEN SHUTTER

BACKGROUND OF THE INVENTION

1. Field of the Invention

The present invention relates to a shutter for a camera, and particularly to a focal plane shutter of the electromagnetic driving type for a single lens reflex camera.

2. Description of the Prior Art

Generally speaking in an electromagnetically driven shutter, a return running of the shutter blades is effected by electromagnetic power as is running for exposure. This method of operation does not require a mechanical association between the shutter and a mechanical part, and it has the advantage that the structure of a shutter can be made simple. However, if return running is effected by electromagnetic power as mentioned above, power must be supplied from a power source with a small capacity within a camera for the return running. Therefore, the number of picture frames which can be photographed will be halved compared to a case where electromagnetic power is used only for the shutter during running for exposure.

Also, during return running of the shutter, it is necessary to revise the direction of current flow from the direction during running for exposure. Thus it is necessary to provide switching means to switch direction of the driving current thereby increasing production cost.

It has been proposed to provide an electromagnetic driving type shutter of the two way exposure type wherein an exposure is also effected during return running of a shutter. However, this method also requires switching means to change the direction of driving current. Thus lowering of production cost cannot be lowered although saving in power consumption is achieved.

SUMMARY OF THE INVENTION

It is an object of the present invention to provide an electromagnetically driven shutter with a simple structure, in which only the exposure running of shutter blades is effected by electromagnetic power with return running of the shutter blades being accomplished by mechanical means thereby overcoming the shortcoming of a conventional electromagnetic driving shutter as mentioned above.

A checking member to check shutter blades at their starting positions is needed even in a focal plane shutter of the electromagnetic driving type as in an ordinary spring driving shutter. That is, if the shutter blades are moved by shaking or shock and the like imparted to a camera, thereby causing an aperture opening when no spring power or electromagnetic driving power for driving the shutter blades is applied, erroneous exposure of the film will occur. Therefore, shutter blade checking means are necessary to prevent such erroneous exposure. Of course it is desirable to release said checking means in synchronism with raising of the mirror before commencing shutter running.

The present invention employs a shutter setting member which is associated with a known type of quick return mirror driving means, and the shutter is set by said member at a running start position and then it is checked at said position. Thereafter before running of the shutter blades by an electromagnetic driving source, the checking is released in association with an upward movement of the mirror.

In an example of the present invention, the mirror driving means return the shutter blades to their running start positions through the above mentioned setting member and the blades are checked at the start positions, with said checking being released in association with raising of the mirror before running of the shutter.

Further, in another example, return of the shutter blades is effected in association with a quick return action of the mirror.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 2 and FIG. 3 are plan views showing the relationship between the checking member and the shutter blades driving member, wherein FIG. 2 shows the setting member as it checks the shutter blades driving member while FIG. 3 shows how the checking of the shutter blades driving member is released by the setting member.

DESCRIPTION OF THE PREFERRED EMBODIMENTS

Figure 1:
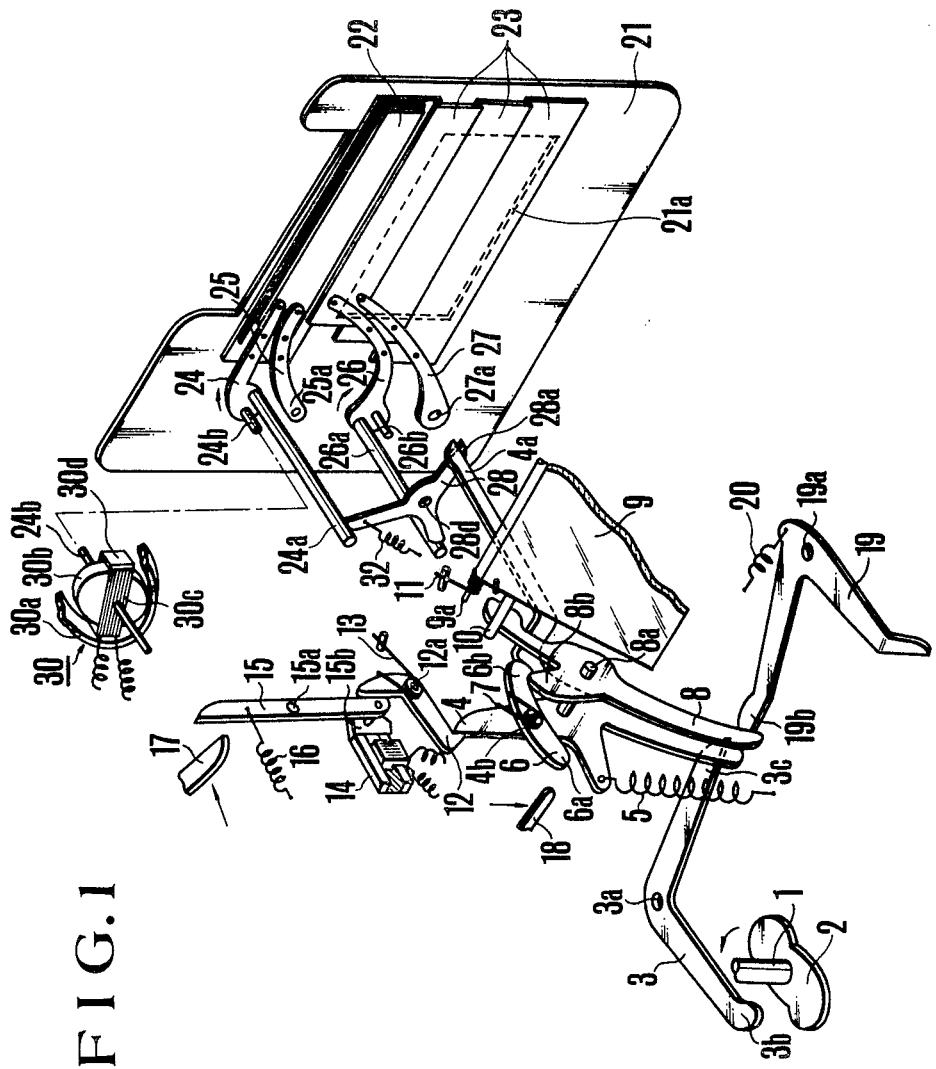
FIG. 1 is a perspective view depicting an example of the present invention.

In FIG. 1, the mechanism of the invention is shown after charging is completed. The mechanism includes a wind-up shaft 1 associated with a wind up lever of a known type, with a cam 2 fixedly provided at its lower end. A charge lever 3 is rotatable around a shaft 3a, and has one arm 3b engaging with the cam 2 while another arm 3c thereof engages with a lower end of a mirror driving lever 4. The driving lever 4 is pivotably supported on a shaft 8a coaxially with a mirror push up lever 8. A clutch lever 6 is axially supported by a shaft 4b at a position above the lever 8 and its hook part 6b is biased by a spring 7 to a direction to engage with a projection 8b of the lever 8. An upper end of the mirror push up lever 8 engages with a pin 10 of a mirror 9, so that when the lever 8 rotates around the shaft 8a in a counterclockwise direction the mirror 9 rotates around its shaft 9a and moves out of a photographing optical path. A main spring 5 operates to drive the mirror 9 and an automatic diaphragm mechanism (not shown). A check lever 12 operates to check the mirror driving lever 4 at its charged position and is axially supported by a shaft 12a, being biased by a spring 13 in a counterclockwise direction. An armature lever 15 can have its one end engaged with the check lever 12 and is axially supported in a manner rotatable around a shaft 15a. The lever 15 holds an armature 15b at its one end and the other end is pulled by a spring 16 and is biased in a counterclockwise direction. An electromagnet 14 having a permanent magnet attached thereto which attracts the armature 15b and generates magnetic flux in a direction offsetting magnetic flux of the permanent magnet when current flows to its coil so that the armature can be separated by the force of the spring 16. A lever 17 associated with the wind up shaft 1 through a mechanism not shown in the drawing pushes the armature 15b against the magnet 14. A release lever 18 is actuated by means not shown in the drawing to a direction shown by the arrow at a time when the running of the rear shutter blades is completed to push one end 6a of the clutch lever 6 for releasing the engagement of the mirror driving lever 4 with the mirror push up lever 8 so that the mirror can be quickly returned. A diaphragm lever 19 is provided to drive an automatic diaphragm mechanism of a phototaking lens not shown in the drawing, and it is axially supported to be rotatable around a shaft 19a, with one end 19b rotatably biased by a spring 20 in a direction always engaging with the lower end of the mirror push up lever 8. A shutter base plate 21 has an exposure opening 21a. A rear shutter blade 22 consists of a plurality (three in the drawing) of light shielding thin plates, and a front shutter blade 23 of similar structure covers the opening 21a as shown in the drawing before an exposure run is started. A rear blade driving lever 24 rotatably supports the three thin plates together with an auxiliary lever 25 which is axially supported by a shaft 25a on the base plate. A front blade driving lever 26 and an auxiliary lever 27 being rotatably supported by a shaft 27a on the base plate, rotatably support the three thin plates of the front blade 23 in a manner similar to the rear blade.

An electromagnetic driving source 30 for the rear blade including a yoke 30a is fixed on the base plate 21 through an attaching member not shown in the drawing, while 30b is a permanent magnet 30b is supported by the yoke 30a, with a coil 30c being rotatable between the permanent magnet 30b and the yoke 30a. A driving shaft 24b has one end fixed to the rotatable coil 30c and the other end fixed to the rear blade driving lever 24. The shaft 24b is rotatably supported on the base plate 21 by supporting means not shown in the drawing. The shaft 26b of the front blade driving lever 26 is also connected to an electromagnetic driving source of similar structure, although not shown in the drawing. A set lever 28 is rotatably attached to the base plate 21 through a supporting member not shown in the drawing. The lever 28 is formed as shown in detail in FIGS. 2 and 3 with three arms and is rotatable around a shaft 28d, with one arm 28a engaging an extended arm 4a of the mirror driving lever 4, whereby the lever 28 remains in its stationary position against a spring 32 when a wind up is completed and the lever 4 is checked by the check lever 12 as shown in FIGS. 1 and 2. Also, forward ends of the other two arms 28b and 28c engage respectively with a pin 24a mounted on the rear blade driving lever 24 and a pin 26a mounted on the front blade driving lever 26, to check the rear blade and the front blade at their positions to start running. In this state the shutter blades are prevented from inadvertent running which may be caused by shaking or shock imparted to the camera.

With the device in the condition shown in FIG. 1, when a switch is closed by pressing a shutter button not shown in the drawing, current flows to a coil of the electromagnetic 14, magnetic flux is generated in a direction offsetting the magnetic flux of the permanent magnet and the armature 15 is separated. The lever 15 rotates by the force of the spring 16 around the shaft 15a pushing with its one end the upper end of the check lever 12 to rotate lever 12 in a clockwise direction against the spring 13. The mirror driving lever 4 is thus released and rotates in a counterclockwise direction around the shaft 8a by the biasing force of the spring 5. As the mirror push up lever 8 is coupled with the mirror driving lever 4 through the clutch lever 6 at this time, the lever 8 also rotates in the same direction. The pin 10 of the mirror 9 is pushed up by the upper arm part of the lever 8 to rotate the mirror 9 around the shaft 9a against the spring 11, and the lower end of the lever 8 pushes the one end 19b of the diaphragm driving lever 19 to rotate the lever 19 around the shaft 19a in a clockwise direction against the spring 20. As a result, the diaphragm of camera not shown in the drawing is stopped down to a preset aperture value.

On the other hand, along with the rotation of the mirror driving lever 4, the extended arm 4a thereof is shifted in an upward direction and the set lever 28 is rotated by the spring 32 whereby its arms 28b, 28c release the checking of the pins 24a, 26a as shown in FIG. 3. Since no driving force is imparted to the shutter blade driving arms 24, 26 during the time of this rotation of the levers 4 and 28, they are stopped at the running start position shown by solid line.

When current is supplied to the electromagnetic driving source for the front shutter blade after the upward motion of the mirror is completed, the shaft 26a and the driving arm 26 rotate in a direction shown by the arrow, and the shutter front blade 23 runs in a downward direction whereby an exposure is effected. When current is supplied to the electromagnetic driving source for the rear shutter blade after elapse of a predetermined period of time, the driving shaft 24b and the arm 24 rotate in the direction shown by the arrow and the rear blade 22 runs downward to cover the opening 21a, whereby the exposure is completed. At this time, the driving arms 24 and 26 come to positions shown by the two dot chain lines in FIG. 3.

When the release lever 18 is moved in the direction shown by the arrow in FIG. 1 by means not shown in the drawing after a completion of the running of the rear blade and pushes the end 6a of the clutch lever 6, the lever 6 rotates in a counterclockwise direction around the shaft 4b against the spring 7, the engagement between the hook part 6b and the projection 8a of the mirror push up lever 8 is released, and the lever 8 receives a force of the spring 20 through the diaphragm driving lever 19 and rotates around the shaft 8a in a clockwise direction. As a result, the mirror 9 rotates by a force of the spring 11 and thus a quick return movement is effected. The diaphragm of the camera simultaneously returns to its release position.

In this state since the shutter blade driving levers 24 and 26 are not checked by the set lever 28, the shutter blades are liable to be moved inadvertently by a shaking or a shock action.

In order to prevent this, an iron piece 30d is attached to the movable coil 30c of the electromagnetic driving source, so that the iron piece 30d is attracted to the permanent magnet thereby retaining the shutter blades at their running completion positions.

Next, when the wind up lever not shown in the drawing is operated, the lever 17 associated therewith moves in the direction of the arrow and pushes the upper end of the armature lever 15, to rotate the lever 15 around the shaft 15a in a clockwise direction against the spring 16, whereby the armature 15b held at the lower end of the lever 15 is pressed against the electromagnet 14 and is attracted by the magnetic flux of the permanent magnet.

A film take up mechanism of known type not shown in the drawing is actuated by operation of the wind up lever to take up film, and at a same time one arm 3b of the charge lever 3 is pushed by the rotation of the cam 2 fixed on the wind up shaft 1 in the direction of arrow, and the lever 3 rotates around the shaft 3a in a clockwise direction. The lower end of the mirror driving lever 4 is then pushed by the other arm 3c to rotate the lever 4 around the shaft 8a in a clockwise direction for charging the spring 5. The lever 4 has its forward end checked by the check lever 12 at the end of this rotation. At this time the clutch lever 6 pivotally supported on the lever 4 engages with the projection 8b of the mirror push up lever 8 at its hook part 6b, and thus the lever 4 and the lever 8 are engaged with each other again. Also, the extended arm 4a of the mirror driving lever 4 moves downward from the position of FIG. 3 and pushes the arm 28a of the set lever 28, to rotate the lever 28 around the shaft 28a in a clockwise direction against the spring 32. By this rotation the arm 28b of the lever 28 engages the pin 24a of the rear blade driving arm, while the other arm 28c engages the pin 26a of the front blade driving arm to rotate the driving arms 24 and 26 respectively in a counterclockwise direction for returning the shutter blades 22 and 23 to their running start positions, at the final positions of which the forward ends of the arms 28b and 28c engage with the pins 24a and 26a shown in FIG. 2 to check the shutter blades.

Figure 4:
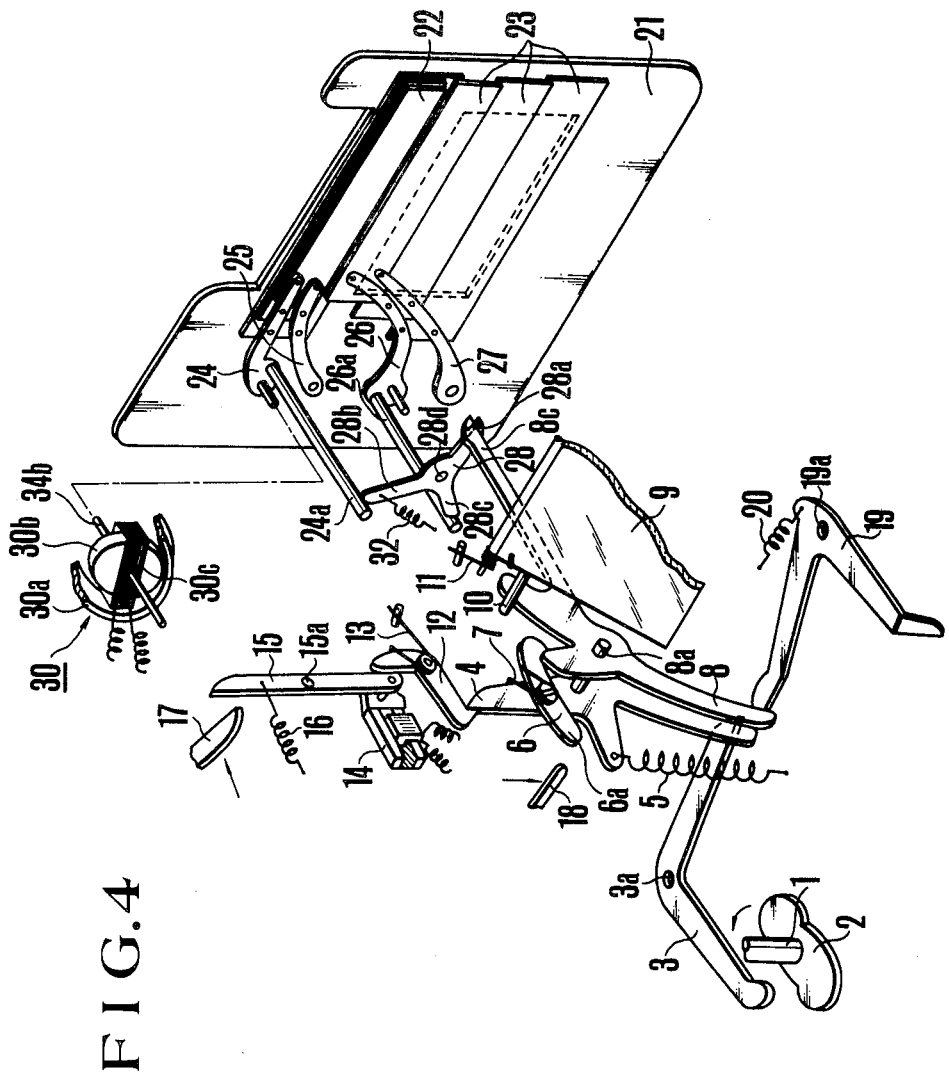
FIG. 4 shows a modified example of the invention.

While the above example is set up such that the set lever 28 is associated with the mirror driving lever 4 to return the shutter blades to their running start positions. FIG. 4 shows a modified example in which the set lever 28 is associated with the mirror push up lever 8. In this drawing, the mirror push up lever 8 has an extended arm 8c engaging with the arm 28a of the set lever 28, and the mirror driving lever 4 does not have the extended arm 4a shown in FIG. 1. Also, the movable coil of the electromagnetic driving source 30 does not have the iron piece 30d. Other than these modifications the set up in FIG. 4 is same as that of FIG. 1, and similar members are identified by the same numbers.

In the embodiment of FIG. 4 when a release button not shown in the drawing is pressed in a state where wind up is completed and the shutter blades are checked at their running start positions by the arm 8c of the mirror push up lever 8 as shown in FIG. 4, the checking of the mirror driving lever 4 is released in the same manner as in the first example. Thus, the driving lever 4 and the mirror push up lever 8 rotate around the shaft 8a by a force of the spring 5 to push up the mirror 9 and at the same time to stop down the diaphragm to a preset value through the diaphragm driving lever 19. At this time the extended arm 8c of the mirror push up lever moves in an upward direction as viewed in the drawing and the set lever 28 rotates around the shaft 28d in a counterclockwise direction by the force of the spring 32. Thus, the forward ends of the arms 28b and 28c move to positions not engaging with the pins 24a and 26a.

After the mirror is raised power is supplied to the electromagnetic driving source and the shutter front blade and rear blade run to effect an exposure as in the first example.

When an exposure is completed and the release lever 18 is actuated to release the engagement of the clutch lever 6 and the mirror push up lever 8, the mirror push up lever 8 receives a force from the spring 20 to rotate around the shaft 8a in a clockwise direction to quickly return the mirror 9. By this rotation of the lever 8 the arm 8c pushes the arm 28a of the set lever 28 to rotate the lever 28 around the shaft 28d in a clockwise direction against the spring 32. Thus, the other arms 28b and 28c push the pins 24a and 24b to rotate the shutter blade driving arms 24 and 26 in a counterclockwise directon for returning the shutter blades 22 and 23 to their running start positions. At at the end of this return movement the arms 24 and 26 are stopped at the positions wherein the pins 24a and 26a are checked by the forward ends of the arms 28b and 28c.

Next, as the wind up lever is operated the mirror driving lever 4 rotates as in the first example and the spring 5 is charged. Then the driving lever 4 and the mirror push up lever 8 are engaged with each other again by the clutch lever 6, and preparation for the next exposure is completed.

During the time of this operation the shutter blades are checked by the set lever 28 and will not be inadvertently moved until a next release.

Since the present invention employs a set up such that shutter blades in an electromagnetically driven shutter are made to run by an electromagnetic driving source at a time of exposure, while a setting of the blades to their running start positions is effected by a setting member associated with mirror driving means, power consumption for shutter driving will be halved and a switch, etc. to change over the rotating direction of the electromagnetic driving source is not needed. Thus an electromagnetically driven shutter with a simple structure can be provided at a low cost.

What is claimed is:

1. An electromagnetically driven shutter mechanism for a single lens reflex camera having a mirror and mirror driving means, comprising:
    (a) an electromagnetic driving source;
    (b) shutter blades;
    (c) shutter blade driving means coupled with said electromagnetic driving source to run said shutter blades for effecting film exposure; and
    (d) a setting member engaged with said shutter blade driving means to set said shutter mechanism and to retain said shutter blades at their running start positions, said setting member being operatively associated with said mirror driving means of said camera and being actuated for setting said shutter, said setting member also releasing retention of said shutter blades when said mirror is actuated preceding a film exposure.

2. An electromagnetically driven shutter mechanism according to claim 1, in which said mirror driving means actuate said setting member in operative association with a film wind up action of said camera to set said shutter blades at their running start positions.

3. An electromagnetically driven shutter mechanism according to claim 1, in which said driving means actuate said setting member in operative association with a return movement of said mirror to set said shutter blades at their running start positions.

4. An electromagnetic shutter mechanism for a single lens reflex camera which includes a mirror movable between a viewing position and a film exposure position comprising:
    shutter blade means operable between a first position and a second position to effect film exposure in said camera;
    electromagnetic means for driving said shutter blade means from said first to said second position;
    lever means responsive to actuation of said camera to effect an exposure operation for moving said mirror from said viewing position to said film exposure position; and means operatively associated with said lever means for mechanically returning said shutter blade means to said first position and for checking movement of said shutter blade means at said first position until a subsequent exposure operation of said camera.

5. A mechanism according to claim 4 wherein said lever means include first pivoted lever means and second pivoted lever means mounted to rotate together in a first rotative direction, with said second pivoted lever means operating to engage said mirror; spring means engaging said first pivoted lever means to urge said first and said second pivoted lever means to rotate together in said first direction to move said mirror from said viewing position to said exposure position; and releasable clutch means rotatively connecting said first and said second pivoted lever means to rotate together in said first direction and for releasing said rotative connection to enable said second pivoted lever means to rotate in a direction opposite to said first direction thereby to enable said mirror to be returned to said viewing position.

6. A mechanism according to claim 5 wherein said means for returning said shutter blade means comprise an arm on said first pivoted lever means extending into engagement with said shutter blade means.

7. A mechanism according to claim 6 wherein said electromagnetic means comprise means for holding said shutter blade means at said second position until operation of said means for returning said shutter blade means to said first position.

8. A mechanism according to claim 5 wherein said means for returning said shutter blade means to said first position comprise an arm on said second pivoted lever means extending into engagement with said shutter blade means.

9. A mechanism according to claim 4 wherein said means for returning said shutter blade means comprise arm means on said lever means extending into engagement with said shutter blade means.

* * * * *